United States Patent
Iraninejad et al.

(10) Patent No.: US 8,320,373 B2
(45) Date of Patent: Nov. 27, 2012

(54) PACKET-BASED PROCESSING SYSTEM

(75) Inventors: Mehraban Iraninejad, Del Mar, CA (US); Jeff Levin, San Diego, CA (US); Michael-David N. Canoy, San Diego, CA (US); Michael Alexander Howard, Cardiff, CA (US); Noam A. Ziv, San Diego, CA (US); Rohan Sudhakar Salvi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 124 days.

(21) Appl. No.: 12/194,447

(22) Filed: Aug. 19, 2008

(65) Prior Publication Data

US 2009/0080429 A1    Mar. 26, 2009

Related U.S. Application Data

(60) Provisional application No. 60/957,509, filed on Aug. 23, 2007.

(51) Int. Cl.
H04L 12/56 (2006.01)
(52) U.S. Cl. ................................. 370/389; 370/412
(58) Field of Classification Search .................. None
See application file for complete search history.

(56) References Cited

U.S. PATENT DOCUMENTS

| | | | |
|---|---|---|---|
| 6,172,991 B1 * | 1/2001 | Mori | 370/474 |
| 6,728,244 B1 | 4/2004 | Takabatake | |
| 6,754,509 B1 * | 6/2004 | Khan et al. | 455/556.1 |
| 6,810,009 B1 * | 10/2004 | Itoi | 370/218 |
| 6,920,135 B1 * | 7/2005 | Lea | 370/389 |
| 6,944,168 B2 * | 9/2005 | Paatela et al. | 370/401 |
| 6,975,644 B2 | 12/2005 | Tordera et al. | |
| 7,145,914 B2 * | 12/2006 | Olarig et al. | 370/413 |
| 7,181,485 B1 * | 2/2007 | Lau et al. | 718/100 |
| 7,251,500 B2 | 7/2007 | Nakagawa et al. | |
| 7,296,093 B1 * | 11/2007 | Olarig et al. | 709/250 |

(Continued)

FOREIGN PATENT DOCUMENTS

CN    1510846 A    7/2004

(Continued)

OTHER PUBLICATIONS

International Search Report and the Written Opinion—PCT/US2008/074091, International Search Authority—European Patent Office—Jul. 23, 2009.

(Continued)

*Primary Examiner* — Gregory Sefcheck
(74) *Attorney, Agent, or Firm* — Charles Chesney (57) ABSTRACT

A packet-based processing system suitable for various applications, such as for a base station or a terminal in a wireless communication system, is described. The packet-based processing system may include multiple processing modules and at least one transport module. The processing modules may send packets to one another via a common packet interface and may operate asynchronously. The transport module(s) may forward the packets sent by the processing modules and may operate asynchronously with respect to the processing modules. Each processing module may include a network interface, at least one buffer, a packet parser, a packet builder, and at least one processing unit. Each processing module may support at least one service. Each packet may include a header and a payload. The header may include a source service address for a source service sending the packet and a destination service address for a recipient service receiving the packet.

22 Claims, 6 Drawing Sheets

U.S. PATENT DOCUMENTS

| | | | |
|---|---|---|---|
| 7,313,140 B2* | 12/2007 | Lakshmanamurthy et al. | 370/394 |
| 7,324,520 B2* | 1/2008 | Lakshmanamurthy et al. | 370/394 |
| 7,356,722 B2* | 4/2008 | Lau et al. | 713/400 |
| 7,389,096 B2 | 6/2008 | Li | |
| 7,477,641 B2* | 1/2009 | Jain et al. | 370/389 |
| 7,596,141 B2* | 9/2009 | Basu et al. | 370/392 |
| 7,602,788 B2* | 10/2009 | Chen et al. | 370/395.1 |
| 7,609,708 B2* | 10/2009 | Soo | 370/412 |
| 7,664,110 B1* | 2/2010 | Lovett et al. | 370/392 |
| 7,685,281 B1* | 3/2010 | Saraiya et al. | 709/226 |
| 7,979,552 B1* | 7/2011 | Saraiya et al. | 709/226 |
| 2003/0099254 A1* | 5/2003 | Richter | 370/466 |
| 2004/0004970 A1* | 1/2004 | Lakshmanamurthy et al. | 370/412 |
| 2004/0085968 A1 | 5/2004 | Chen et al. | |
| 2005/0033586 A1 | 2/2005 | Savell | |
| 2005/0089031 A1* | 4/2005 | Krueger | 370/389 |
| 2006/0146808 A1* | 7/2006 | Campini et al. | 370/360 |
| 2007/0008985 A1* | 1/2007 | Lakshmanamurthy et al. | 370/412 |
| 2007/0025361 A1* | 2/2007 | Lin et al. | 370/399 |
| 2007/0058623 A1 | 3/2007 | Moorti et al. | |
| 2007/0183541 A1 | 8/2007 | Moorti et al. | |
| 2008/0159528 A1* | 7/2008 | Feghali et al. | 380/30 |
| 2008/0235450 A1* | 9/2008 | Han et al. | 711/118 |
| 2009/0279559 A1* | 11/2009 | Wong et al. | 370/412 |

FOREIGN PATENT DOCUMENTS

| | | |
|---|---|---|
| CN | 1714546 A | 12/2005 |
| JP | 63275251 A | 11/1988 |
| JP | 2004274292 A | 9/2004 |
| JP | 2005056426 A | 3/2005 |
| JP | 2005117463 A | 4/2005 |
| JP | 2005524908 A | 8/2005 |
| JP | 2005244470 A | 9/2005 |
| WO | WO02058330 | 7/2002 |
| WO | WO03096214 A1 | 11/2003 |

OTHER PUBLICATIONS

Jens Muttersbach, et al., "Practical Design of Globally-Asynchronous Locally-Synchronous Systems, (ASYNC 2000) Proceedings Sixth International Symposium ON, [Online] Apr. 6, 2000, XP002536690 Retrieved from the Internet: URL:http://i eeexplorei eeeorg/stamp/stamp jsp?arnumber=00836791> [retrieved on Jul. 7, 2007] p. 52-p. 59," Advanced Research in Asynchronous Circuits and Systems, 2000, 52-59.

Krstic M., et al., "System integration by request-driven GALS design, Stevenage, RGYAUME-UNI, (Sep. 6, 2006), XP002536689—the whole document," Institution of Electrical Engineers, 2006, 153, 362-372.

Taiwan Search Report—TW097132396—TIPO—Nov. 23, 2011.

* cited by examiner

PACKET-BASED PROCESSING SYSTEM

CLAIM OF PRIORITY UNDER 35 U.S.C. §119

The present Application for Patent claims priority to Provisional U.S. Application Ser. No. 60/957,509, entitled "METHOD AND APPARATUS FOR PACKET BASED MODEM DESIGN," filed Aug. 23, 2007, assigned to the assignee hereof, and expressly incorporated herein by reference.

BACKGROUND

1. Field

The present disclosure relates generally to data processing, and more specifically to a processing system suitable for wireless communication and other applications.

2. Background

Wireless communication systems are widely deployed to provide various communication services such as voice, video, packet data, messaging, broadcast, etc. These systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

In a wireless communication system, a base station may send data and signaling to one or more terminals and may receive data and signaling from the terminals. The base station as well as each terminal may perform various types of processing for transmission and reception of data and signaling. The processing by each entity may be computationally intensive and may be subject to changes due to various reasons. A processing system that can perform the processing in an efficient manner and which can be more readily designed and tested is highly desirable.

SUMMARY

A packet-based processing system that may be used for various applications, such as for a base station or a terminal in a wireless communication system, is described herein. The packet-based processing system may be implemented in various manners including on an application specific integrated circuit (ASIC). The packet-based processing system may provide various advantages including scalability, flexibility, ease of design and testing, etc.

In one design, a packet-based processing system may include a plurality of processing modules and at least one transport module. The processing modules may send packets to one another via a common packet interface, which may utilize a common packet format for all packets sent by the processing modules. A packet may also be referred to as a message, a data unit, a data block, etc. The processing modules may operate asynchronously, and each processing module may operate based on at least one clock selected for that processing module. The transport module(s) may forward the packets sent by the processing modules and may operate asynchronously with respect to the processing modules.

In one design, a processing module may include a network interface, at least one buffer, at least one processing unit, a packet parser, and a packet builder. The network interface may receive and send packets for the processing module. The packet parser may receive packets from the network interface, provide input data from the received packets to the buffer(s), and provide input control information from the received packets to the processing unit(s). The processing unit(s) may process the input data and provide output data to the buffer(s). The packet builder may receive the output data from the buffer(s), receive output control information from the processing unit(s), and build packets with the output data and in accordance with the output control information.

In one design, each processing module may support at least one service and may operate on packets for all services supported by that processing module. Each packet may include a header and a payload. The header for each packet may include (i) a source service address for a source service sending the packet and (ii) a destination service address for a recipient service receiving the packet. Each service may support at least one service port. The header for each packet may further include (i) a source service port for a service port at the source service and (ii) a destination service port for a service port at the recipient service.

Various aspects and features of the disclosure are described in further detail below.

DETAILED DESCRIPTION

A packet-based processing system may be used for various applications such as wireless communication, networking, computing, etc. In general, a packet-based processing system may be used for any application in which processing can be distributed across multiple processing modules. Each processing module may be implemented with hardware, software, firmware, or a combination thereof. For clarity, certain aspects of the packet-based processing system are described below for wireless communication.

Figure 1:
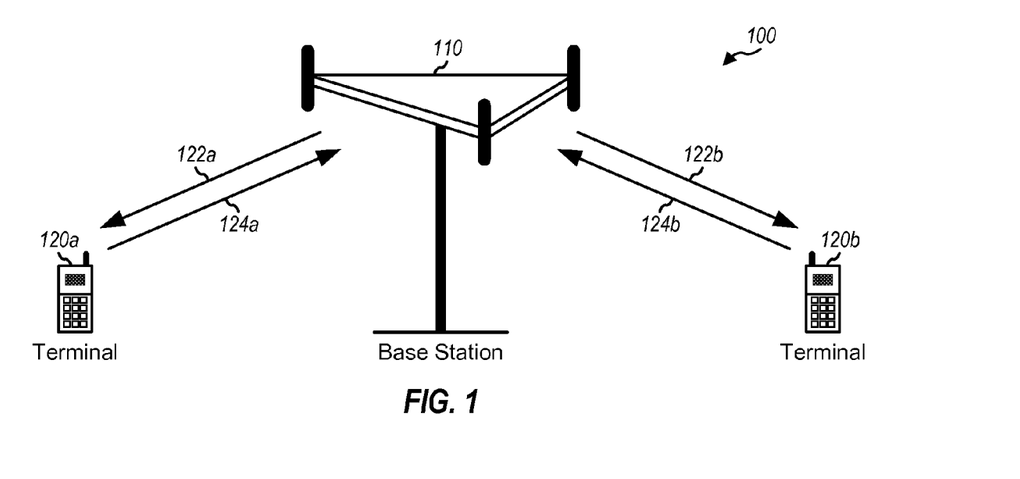
FIG. 1 shows a wireless communication system.

FIG. 1 shows a wireless communication system 100, which may include a number of base stations and other network entities. For simplicity, only one base station 110 is shown in FIG. 1. Base station 110 may be a fixed station that communicates with the terminals and may also be referred to as a Node B, an evolved Node B (eNB), an access point, etc. Base station 110 may communicate with a terminal 120a via downlink 122a and uplink 124a and may communicate with a terminal 120b via downlink 122b and uplink 124b. A terminal may be stationary or mobile and may also be referred to as a mobile station, a user equipment (UE), an access terminal, a subscriber unit, a station, etc. A terminal may be a cellular phone, a personal digital assistant (PDA), a wireless communication device, a handheld device, a wireless modem, a laptop computer, etc.

Figure 2:
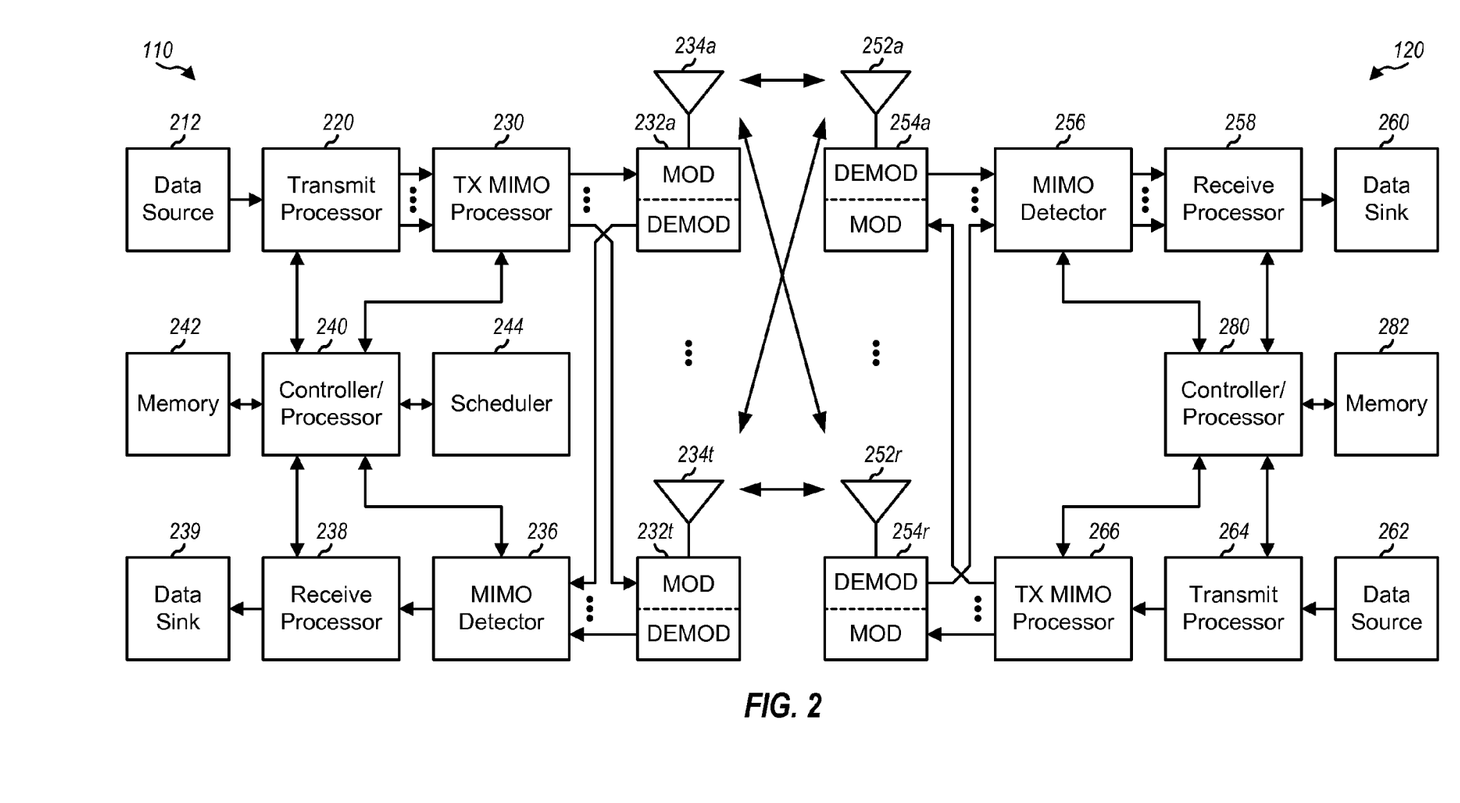
FIG. 2 shows a block diagram of a base station and a terminal.

FIG. 2 shows a block diagram of a design of base station 110 and terminal 120, which may be terminal 120a or 120b in FIG. 1. In this design, base station 110 is equipped with T antennas 234a through 234t, and terminal 120 is equipped with R antennas 252a through 252r, where in general T≧1 and R≧1.

At base station 110, a transmit processor 220 may receive data for one or more terminals from a data source 212, process the data for each terminal based on one or more modulation and coding schemes selected for that terminal, and provide data symbols for all terminals. Transmit processor 220 may also process signaling and provide signaling symbols. A transmit (TX) multiple-input multiple-output (MIMO) processor 230 may multiplex the data symbols, the signaling symbols, and pilot symbols. TX MIMO processor 230 may perform spatial processing (e.g., preceding) on the multiplexed symbols, if applicable, and provide T output symbol streams to T modulators (MODs) 232a through 232t. Each modulator 232 may process a respective output symbol stream (e.g., for CDMA, OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At terminal 120, antennas 252a through 252r may receive the downlink signals from base station 110 and provide received signals to demodulators (DEMODs) 254a through 254r, respectively. Each demodulator 254 may condition (e.g., filter, amplify, downconvert, and digitize) a respective received signal to obtain received samples. Each demodulator 254 may further process the received samples (e.g., for CDMA, OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate, deinterleave, and decode) the detected symbols and provide decoded data for terminal 120 to a data sink 260.

On the uplink, at terminal 120, data from a data source 262 and signaling from a controller/processor 280 may be processed by a transmit processor 264, precoded by a TX MIMO processor 266 if applicable, conditioned by modulators 254a through 254r, and transmitted to base station 110. At base station 110, the uplink signals from terminal 120 may be received by antennas 234, conditioned by demodulators 232, processed by a MIMO detector 236 if applicable, and further processed by a receive processor 238 to obtain the data and signaling transmitted by terminal 120.

Controllers/processors 240 and 280 may direct the operation at base station 110 and terminal 120, respectively. Memories 242 and 282 may store data and program codes for base station 110 and terminal 120, respectively. A scheduler 244 may schedule terminals for downlink and/or uplink transmission and may provide assignments of resources for the scheduled terminals.

FIG. 2 shows various functional blocks at base station 110 and terminal 120 in accordance with one design. Base station 110 and terminal 120 may include different and/or other functional blocks not shown in FIG. 2.

In general, a base station and a terminal may each include any number of processing modules. The processing modules may also be referred to as processing engines, processing blocks, processing nodes, etc. Each processing module may perform a designated set of functions, e.g., searching, modulation, demodulation, encoding, decoding, etc. Each processing module may be implemented with hardware, software, firmware, or a combination thereof. For example, a processing module may include one or more digital signal processors (DSPs), reduced instruction set computer (RISC) processors, field programmable gate arrays (FPGAs), ASICs, processors, controllers, circuit boards (e.g., baseband boards, RF boards, etc.), and so on. As another example, a processing module may be implemented with software and/or firmware executed by one or more general-purpose processors, RISC processors, etc.

Figure 3:
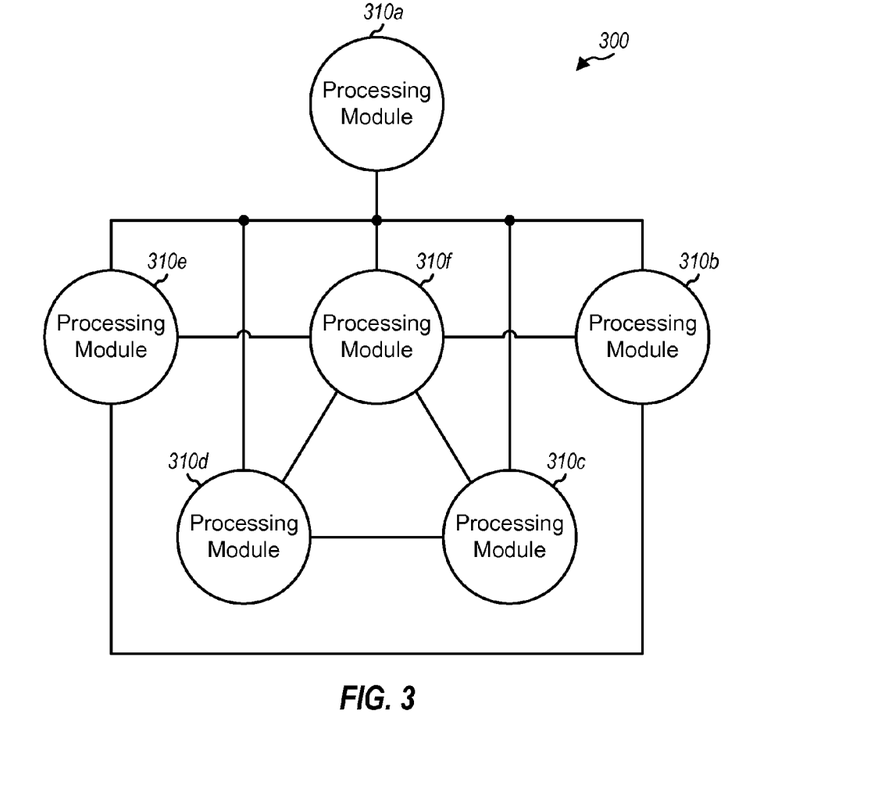
FIG. 3 shows a bus-based processing system.

FIG. 3 shows a design of a bus-based processing system 300. In the design shown in FIG. 3, processing system 300 includes six processing modules 310a through 310f that may be designed to perform the desired functions. Each processing module 310 may communicate with one or more other processing modules 310 via one or more interconnections. For example, processing module 310f may communicate with the other five processing modules 310a through 310e via five custom interconnections. Each interconnection may be a point-to-point bus or a point-to-multipoint bus.

In the design shown in FIG. 3, processing modules 310 may be tightly coupled and may communicate with each other via custom interfaces. The custom interfaces may be specifically designed based on the input and output requirements of each processing module. The custom interfaces may make certain assumptions about the source and destination clocks, which would then need to be carefully planned in advance. The data to be operated on by the processing modules may be stored in a central shared memory (not shown in FIG. 3), which may improve performance of the tightly-coupled processing modules but may increase dependency of each processing module on other parts of the processing system. Furthermore, the timing relationship and arbitration between data received from other processing modules may be critical. Hence, small changes in one processing module may require changes to other processing modules. Another disadvantage of the bus-based architecture is that it is typically non-scalable. Furthermore, it may be difficult to adapt the bus-based processing system (e.g., due to changes in requirements, underperformance of a processing module, upgrades, etc.) since changes to one processing module may require changes to other parts of the system.

Figure 4A:
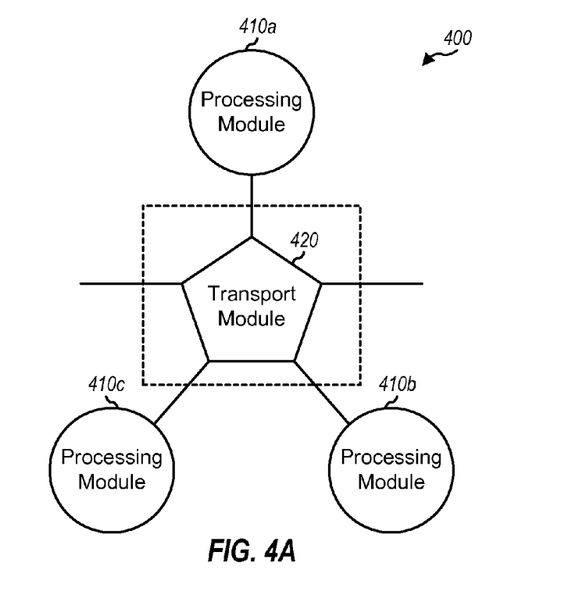
FIGS. 4A and 4B show two designs of a packet-based processing system.

FIG. 4A shows a design of a packet-based processing system 400, which may provide certain advantages over bus-based processing system 300 in FIG. 3. In the design shown in FIG. 4A, processing system 400 includes three processing modules 410a, 410b and 410c coupled to a transport module 420. Each processing module 410 may perform a designated set of functions. Transport module 420 may operate as a router for processing modules 410. Transport module 420 may receive packets from processing modules 410 and may forward the packets to the proper recipient processing modules.

Figure 4B:
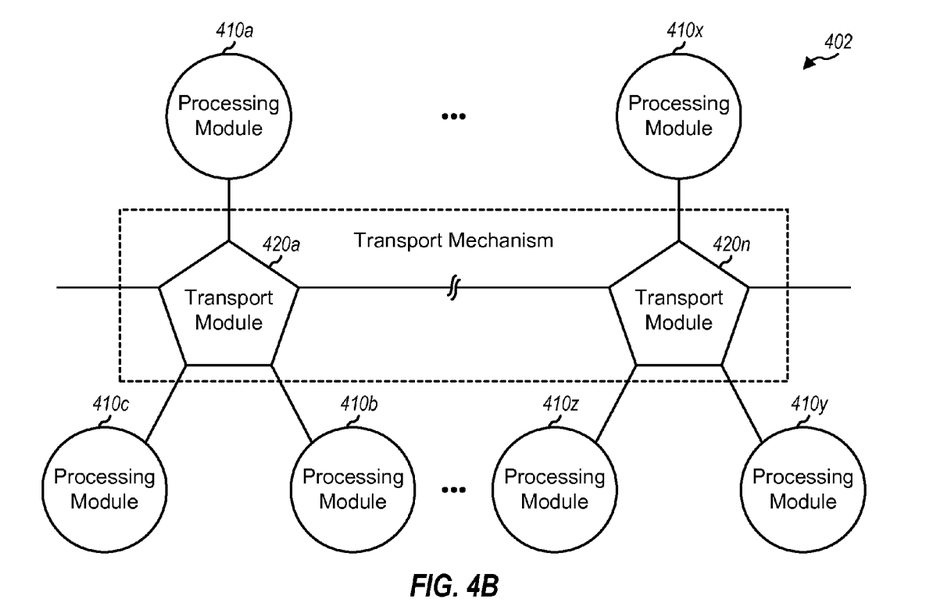

FIG. 4B shows a design of a packet-based processing system 402. In the design shown in FIG. 4B, processing system 402 includes multiple processing modules 410a through 410z and multiple transport modules 420a through 420n. Each processing module 410 may perform a designated set of functions. Each transport module 420 may be coupled to one or more processing modules 410 and to one or more other transport modules 420. Each transport module 420 may operate as a router, receive packets from the processing modules and transport modules coupled to that transport module, and forward the packets to the recipient processing modules and transport modules.

FIGS. 4A and 4B show two example designs of two packet-based processing systems. In general, a packet-based processing system may include any number of processing modules and any number of transport modules, which may be interconnected in any manner. The processing modules may perform desired functions for the packet-based processing system. The number and type of processing modules to include in the packet-based processing system may be dependent on the processing requirements of the system. The transport module(s) may form a transport mechanism for the system and may route packets among the different processing modules.

A packet-based processing system may separate processing/computing from communication/transport. Processing-specific issues may be addressed separately from communication issues. A packet-based processing system may utilize a globally asynchronous/locally synchronous (GALS) architecture in which each individual processing module may operate synchronously but different processing modules may be asynchronous to one another. The processing modules may be loosely coupled and may operate on independent clocks to achieve the desired functionality.

Each processing module may receive packets (e.g., for task description, sideband information, and/or data) from one or more upstream processing modules, process the tasks for the received packets, and provide results (e.g., task description, sideband information, and/or data) via packets to one or more downstream processing modules. The processing modules may assume that the transport mechanism is not reliable and may gracefully handle occasional loss or duplication of information.

The transport mechanism may provide a communication link between the processing modules. The transport mechanism may receive packets from source processing modules and may forward these packets to destination processing modules. A common packet interface may be used for all processing modules and may simplify transport of packets between the processing modules. To increase flexibility, the transport mechanism may be asynchronous with respect to the processing modules. The transport mechanism may be designed with sufficient bandwidth in order to transport all of the packets exchanged between the processing modules. The transport mechanism may deliver packets in order from the source to the destination processing modules. A packet-based processing system may be scalable and flexible as long as the transport mechanism has sufficiently large bandwidth. The bandwidth of the transport mechanism may be scalable and may be adjusted by increasing the bus width of the links and switches.

A packet-based processing system may be transaction oriented. A processing module may receive a transaction, which may be associated with information about a task to be performed, data for the task, and any sideband information to be forwarded to downstream processing module(s) along with transaction results. Transactions may be of different types, e.g., configuration, operation, debug, etc. Each transaction may cause one or more transactions to the source or downstream processing modules. Control packets such as reset, acknowledge, flow control, system timer, etc., may be used.

Figure 5:
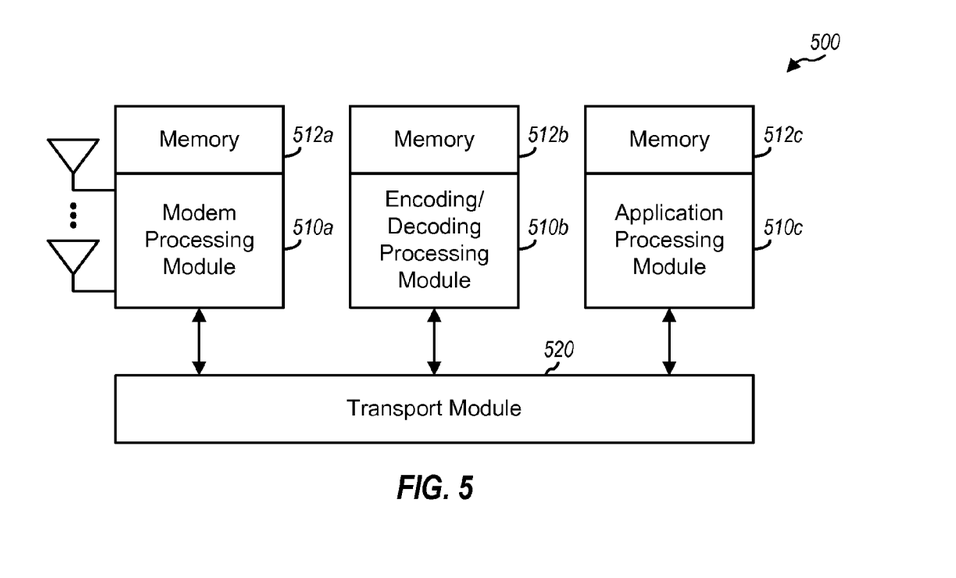
FIG. 5 shows a packet-based processing system for a base station or a terminal.

FIG. 5 shows a block diagram of a design of a packet-based processing system 500, which may be used for base station 110 or terminal 120 in FIG. 2. In this design, processing system 500 includes a modem processing module 510*a*, an encoding/decoding processing module 510*b*, an application processing module 510*c*, and a transport module 520.

Processing module 510*a* may perform modulation for data transmission and demodulation for data reception. The modulation/demodulation (modem) processing may be dependent on the radio technology being supported, e.g., CDMA, TDMA, FDMA, OFDMA, SC-FDMA, etc. Processing module 510*b* may perform channel encoding and decoding (e.g., Turbo encoding and decoding), interleaving, deinterleaving, etc. Processing module 510*c* may perform processing for higher-layer applications such as audio/video encoding and decoding, etc. Processing module 510*c* may be present if processing system 500 is used for terminal 120 and may be omitted if processing system 500 is used for base station 110. Each processing module 510 may have an associated memory 512, which may be internal or external to the processing module. Memory 512 for each processing module 510 may store input data received from other processing modules, output data to send to other processing modules, and intermediate data being operated on by the processing module. Transport module 520 may be coupled processing modules 510*a* through 510*c* and may route packets for the processing modules.

FIG. 5 shows an example design with packet-based processing system 500 including three processing modules 510*a*, 510*b* and 510*c*. Processing system 500 may include different and/or additional processing modules, which may perform other functions. For example, processing system 500 may include processing modules for fast Fourier transform (FFT) and inverse FFT (IFFT), modulation and demodulation, scrambling and descrambling, interleaving and deinterleaving, channel encoding and decoding, spatial processing (e.g., precoding or beamforming), MIMO detection, pilot generation, power control, channel estimation, time tracking loop, frequency tracking loop, phase rotation, automatic gain control (AGC), etc. Processing system 500 may also include additional transport modules.

Figure 6:
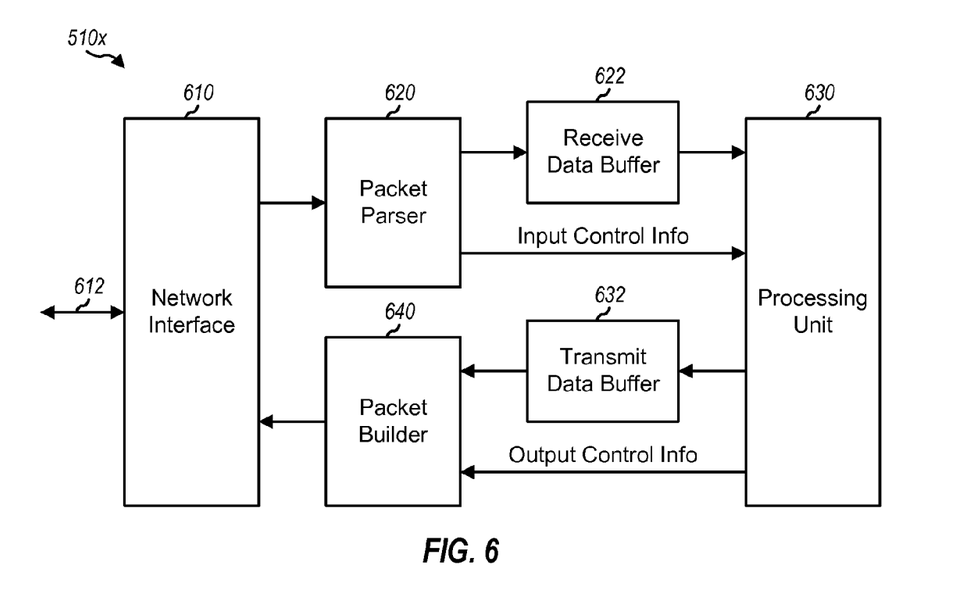
FIG. 6 shows a block diagram of a processing module.

FIG. 6 shows a block diagram of a design of a processing module 510*x*, which may be used for any one of the processing modules in FIG. 5. Within processing module 510*x*, a network interface 610 may exchange (e.g., send and receive) packets with an associated transport module (not shown in FIG. 6) via a link 612. Network interface 610 may receive one or more addresses or identifiers (IDs) assigned to processing module 510*x*. Network interface 610 may identify input packets destined for processing module 510*x* based on the assigned address(es) and may pass the input packets to a packet parser 620. Network interface 610 may also detect packets that have been received in error and may discard these packets.

Packet parser 620 may parse the input packets from network interface 610, provide input data from the input packets to a receive data buffer 622, and provide input control information from the input packets to a processing unit 630. The input data may be sent in data packets, and the input control information may be sent in control packets. In this case, packet parser 620 may parse the input packets into data packets and control packets. The control packets may cause an immediate action in processing module 510*x* (e.g., reset or flow control) or may cause other tasks to be performed. Packet parser 620 may also respond to certain packets that do not require communication with processing unit 630.

Buffer 622 may store the input data until processing unit 630 is ready to receive the data. Buffer 622 may provide the input data when requested and in the order in which the data is received. Buffer 622 may also be used for clock rate translation between processing unit 630 and the rest of the processing system. Buffer 622 may be implemented with a first-in-first-out (FIFO) buffer or some other type of buffer.

Processing unit 630 may process the input data from buffer 622, e.g., as indicated by the input control information. Processing unit 630 may provide output data to a transmit data buffer 632 and may provide output control information to a packet builder 640. Buffer 632 may store the output data from processing unit 630 until the data is ready to be sent. Buffer 632 may also be used for clock rate translation between processing unit 630 and the rest of the processing system. Buffer 632 may be implemented with a FIFO buffer or some other type of buffer.

Packet builder 640 may generate output packets with the output data from buffer 632 and as indicated by the output control information from processing unit 630. Network interface 610 may receive the output packets from packet builder 640 and may send the packets via link 612 to the associated transport module. Buffers 622 and 632 may be part of memory 512 in FIG. 5 and may have suitable sizes, which may be determined by the functions being performed by processing module 510x.

Processing module 510x may be used for each processing module in a packet-based processing system. Different processing modules may send different packets. However, a common packet interface may be used by all processing modules. Furthermore, the processing modules may be isolated from specific operations of the transport mechanism and may be unaffected by changes to the transport mechanism.

A packet-based processing system may include one or more processing modules, and each processing module may support one or more services. A service may be a logical module supporting one or more logical functions and capable of sending and receiving packets for all supported logical functions. A packet-based processing system may be viewed as supporting an interconnected set of services.

A Standard Packet Protocol (SPP) may be defined and used as a transport independent protocol for a packet-based processing system. SPP may support data exchanges for a scaleable, high bandwidth, low latency, packet-based processing system. SPP may support service-to-service communication using an asynchronous and scalable interface that may allow services to interoperate with one another independent of their specific implementations (e.g., hardware, software, and/or firmware) and also independent of the transport mechanism. SPP may provide a procedure for services to send packets to other services. SPP may be transaction oriented and may not guarantee delivery and duplicate protection. Services requiring reliable delivery of packets may achieve this with a suitable procedure at an application layer and may extend packets to carry pertinent information for the procedure.

Figure 7:
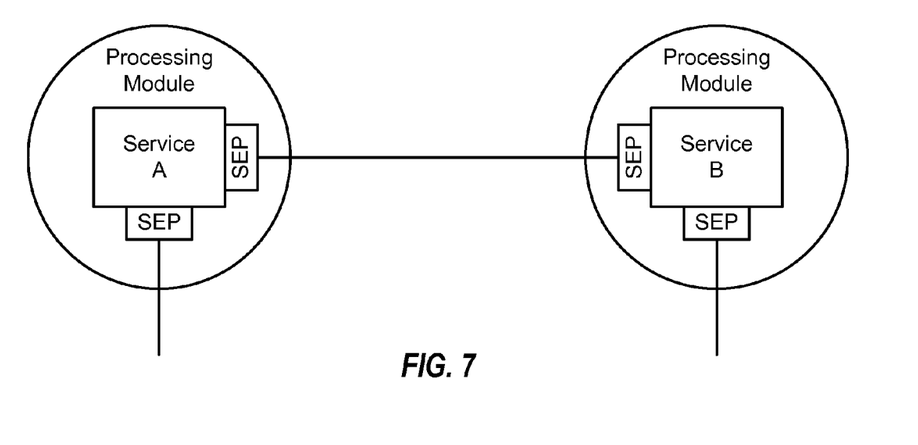
FIG. 7 shows communication between two services.

FIG. 7 shows a design of communication between two services A and B, which may reside in two processing modules. A service may have one or more service end points (SEPs). In one design, each service end point may be identified by a service address and a service port. Service addresses may be used to route packets across a packet-based processing system and may be considered as physical addresses for services. Service ports may be used by services to separate packets into different streams, which may be for different logical functions. All service end points of a given service may have the same service address but different service ports. The transport mechanism may route packets based on their service addresses and may ignore the service ports. In general, an SEP address may include any number of parts, and each part may have a suitable bit width.

The services in a packet-based processing system may be assigned unique unicast service addresses. Multiple services may also be assigned a multicast service address and may receive packets sent to that multicast service address. All services may also receive packets sent to a broadcast service address. The multicast and broadcast service addresses may be taken from a range of service addresses reserved for multicast and broadcast.

Each service may know (e.g., may be configured with) the addresses of the SEPs of other services with which that service can exchange packets. A network interface for a processing module may have knowledge of all services supported by that processing module. The network interface may route input packets to the appropriate services within the processing module and may send output packets to appropriate recipient services.

Figure 8:
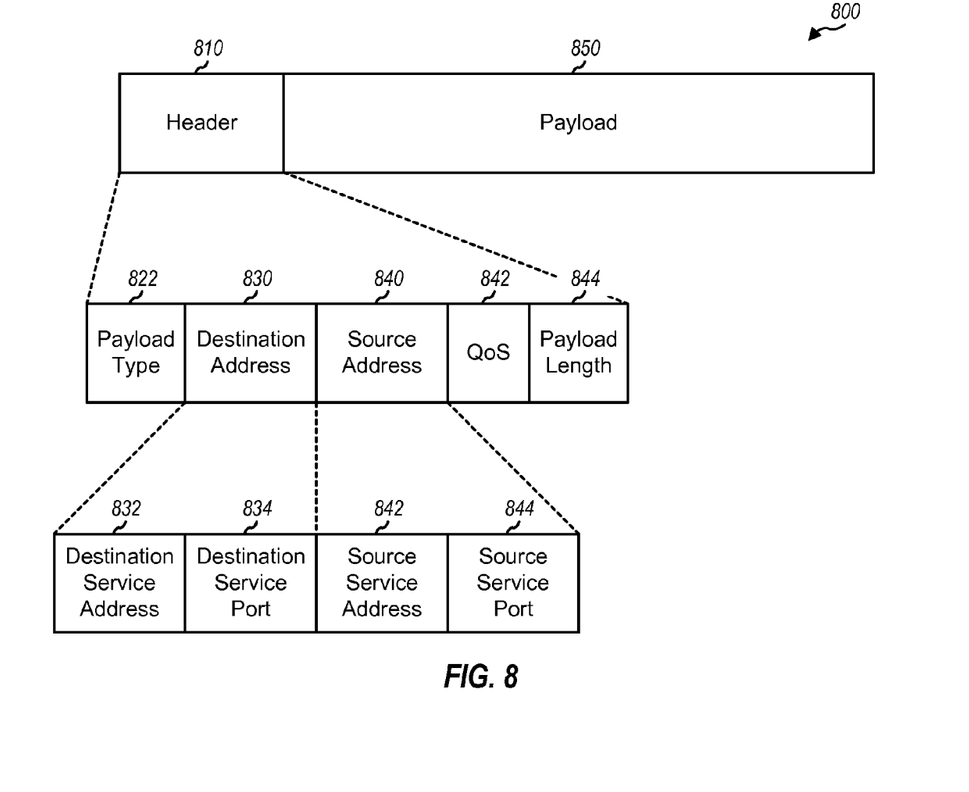
FIG. 8 shows a packet format for a common packet interface.

FIG. 8 shows a design of a packet format 800 that may be used for packets exchanged between services in a packet-based processing system. In this design, a packet may include a header 810 carrying header information and a payload 850 carrying data. Within header 810, a payload type field 822 may indicate the type of payload being sent in payload 850. A destination address field 830 may include (i) a destination service address field 832 carrying a service address of a recipient service for the packet and (ii) a destination service port field 834 identifying a service port of the recipient service for the packet. A source address field 840 may include (i) a source service address field 842 carrying a service address of a service sending the packet and (ii) a source service port field 844 identifying a service port via which the packet is sent. A quality of service (QoS) field 842 may indicate the priority of the data in payload 850, e.g., with 0 indicating lowest priority data and 7 indicating highest priority data. A payload length field 844 may convey the length of payload 850.

FIG. 8 shows one design of a packet format that may be used for a packet-based processing system. Other packet formats with different fields may also be used.

In general, a packet-based processing system may use any transport mechanism to transport packets between services. The transport mechanism may utilize an available transport protocol such as Ethernet, Serial Rapid I/O, Advanced eXtensible Interface (AXI), etc. The transport mechanism may also utilize a proprietary transport protocol, which may be more appropriate for implementation of the packet-based processing system on an ASIC. If SPP is used with a particular transport protocol, then the SPP packet header may reuse the fields from this particular transport protocol in order to reduce overhead. The format of an actual packet may thus be dependant on the particular transport protocol. During transport, packets may not exist in the packet format shown in FIG. 8 and may be perturbed to allow for efficient use of the transport mechanism.

Figure 9:
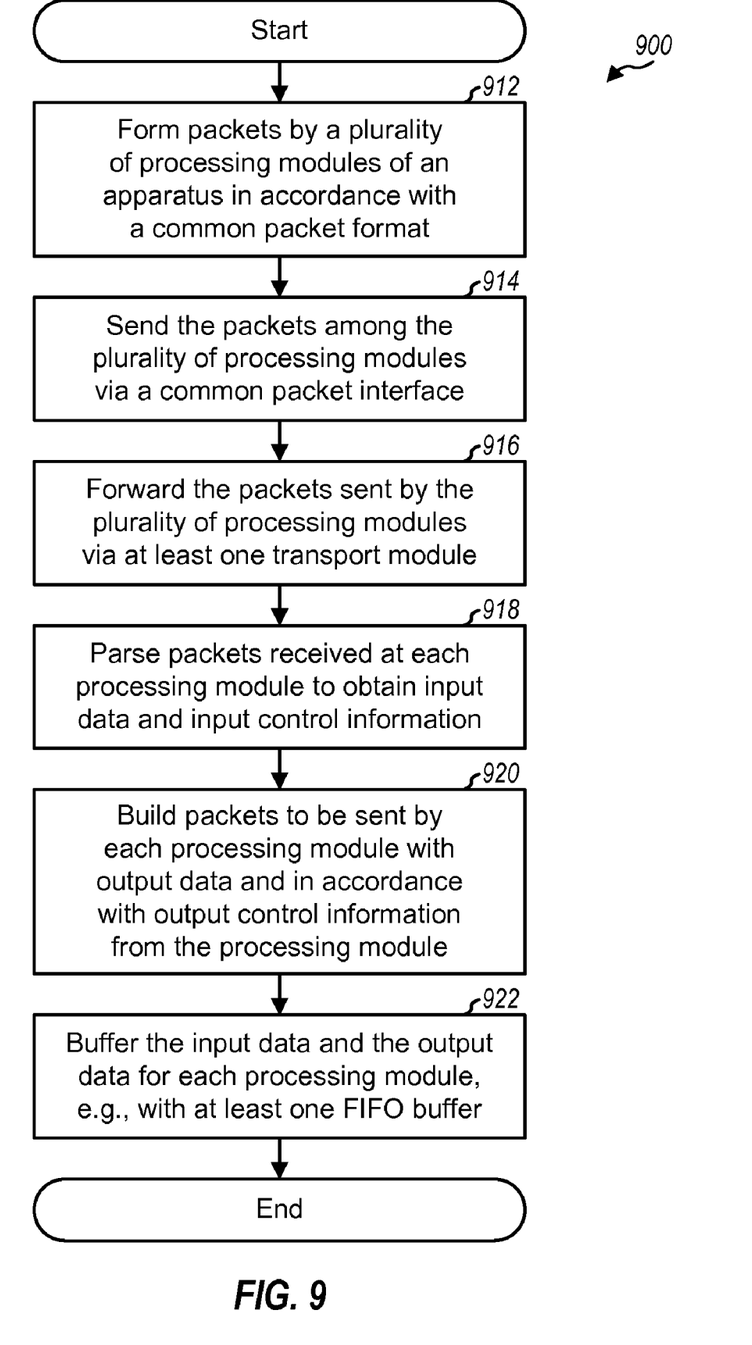
FIG. 9 shows a process for operation in a packet-based processing system.

FIG. 9 shows a design of a process 900 for operation in a packet-based processing system. Packets may be formed by a plurality of processing modules of an apparatus in accordance with a common packet format (block 912). The apparatus may be an ASIC, a circuit board, an electronics device, an equipment rack, etc. The apparatus may be for a base station, a terminal, or some other entity in a wireless communication system. The common packet format may comprise a header and a payload, and the header may include a source address and a destination address. The packets may be sent among the plurality of processing modules via a common packet interface (block 914). The packets sent by the plurality of processing modules may be forwarded via at least one transport module based on the source addresses and the destination addresses of the packets (block 916). Packets received at each processing module may be parsed to obtain input data and input control information (block 918). Packets to be sent by each processing module may be built with output data and in accordance with output control information from the processing module (block 920). The input data and the output data for each processing module may be buffered, e.g., with one FIFO buffer for the input data and another FIFO buffer for the output data (block 922).

Each processing module may support at least one service. Each packet may then include (i) a source service address for a source service sending the packet and (ii) a destination service address for a recipient service receiving the packet. Each service may support at least one service port. Each packet may further include (i) a source service port for a service port at the source service and (ii) a destination service port for a service port at the recipient service.

The plurality of processing modules may operate asynchronously. Each processing module may operate based on at least one clock selected for that processing module. The least one transport module may operate asynchronously with respect to the plurality of processing modules.

A packet-based processing system may be used for various applications. For example, a packet-based processing system may be used for emulation of a base station or a terminal. The emulation may implement functionalities of the base station or the terminal and may be used for various purposes such as proof of concept, testing and refinement of physical layer and Medium Access Control (MAC) layer designs and parameters, over-the-air testing, system capacity testing, performance verification, demonstrations, etc. As another example, a packet-based processing system may be used for an ASIC such as a network-on-chip (NoC) or a system-on-chip (SoC). For all applications, a packet-based processing system may flexibly support all desired functions, may be scalable to support additional functions and/or requirements, and may be upgradeable to take advantage of advances in hardware and new circuit technologies.

A packet-based processing system may have one or more of the following advantages:

The packet-based processing system can easily adapt to algorithm modifications. Only processing module(s) affected by the modifications may be changed or adapted, and other processing module(s) may be left alone.

Additional processing modules may be attached to the transport mechanism to increase processing power. For example, if a single DSP cannot provide sufficient processing power, then a second DSP may be added to the system.

The processing modules may be independently upgraded to take advantage of new technology. A given processing module may be removed and replaced with a new one. This may allow for fast and cost effective upgrades without having to significantly change the rest of the system.

One or more processing modules may be removed from the system for easy troubleshooting, repair, or upgrading.

The processing modules may be individually designed to achieve the required performance. Each processing module may be implemented with hardware, software, and/or firmware to achieve the desired functions and performance. From the system perspective, the specific implementation of each processing module is irrelevant. This allows functions to be implemented with different hardware platforms (e.g., to migrate from DSP to FPGA, then to ASIC) as algorithms are tested and frozen. Migration from one type of device to another type may involve only changes to how the packets are routed to/from the processing module.

The processing modules may have separate and independent clocks. Each processing module may operate at a suitable clock rate to obtain the desired performance. Operating the processing modules at their required clock rates may result in power savings over a conventional design having all or most of the processing modules operating on a single fast clock. Due to asynchronous operation, switching for transistors in the system may occur at different clock edges, which may reduce power supply noise in the system.

Timing closure may be easier to achieve for the system since a single large clock tree is not needed to provide clocks across the system.

A common packet interface may be used for all processing modules. The common packet interface may reduce design effort, increase design reuse, simplify verification, and simplify testing. The common packet interface may also allow for use of the same test environment for all processing modules as well as at system level. The common packet interface may also allow for controllability and observability of input and output packets at each processing module. The common packet interface may also allow for easy decoupling of transport clock from processing clocks for each processing module.

If implemented on an ASIC, the packet-based processing system may allow for fast and easy changes to logic through few metal layers. This may result in reduced cost and shorter time to product availability.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. An apparatus for wireless communication, comprising:
a plurality of processing modules operative to send packets to one another via a common packet interface and to perform at least one function that involves transforming input data into output data, wherein at least some of the plurality of processing modules perform different functions, and wherein the plurality of processing modules comprise a modem processing module and an encoding/decoding processing module; and
at least one transport module coupled to the plurality of processing modules and operative to forward the packets sent by the plurality of processing modules;
wherein each processing module comprises a network interface operative to receive and send packets for the processing module, a receive data buffer operative to store the input data from packets received by the network interface, a transmit data buffer operative to store the output data for packets to be sent by the network interface, and at least one processing unit operative to process the input data and provide the output data;
wherein each processing module further comprises a packet parser operative to receive the packets from the network interface, to provide the input data from the received packets to the receive data buffer, and to provide input control information from the received packets directly to the at least one processing unit, wherein the input control information is not stored in the receive data buffer; and
wherein each processing module further comprises a packet builder operative to receive the output data from the transmit data buffer, to receive output control information directly from the at least one processing unit, and to build packets with the output data and in accordance with the output control information, wherein the output control information is not stored in the transmit data buffer.

2. The apparatus of claim 1, wherein the plurality of processing modules operate asynchronously, and wherein the plurality of processing modules operate on independent clocks.

3. The apparatus of claim 1, wherein each processing module operates based on at least one clock selected for the processing module.

4. The apparatus of claim 1, wherein the at least one transport module operates asynchronously with respect to the plurality of processing modules.

5. The apparatus of claim 1, wherein each processing module supports at least one service and operates on packets for the at least one service.

6. The apparatus of claim 1, wherein the common packet interface utilizes a common packet format for all packets sent by the plurality of processing modules.

7. The apparatus of claim 1, wherein each packet comprises a header and a payload, the header comprising a source address and a destination address, and wherein the at least one transport module is operative to forward the packets sent by the plurality of processing modules based on source addresses and destination addresses of the packets.

8. The apparatus of claim 1, wherein each processing module supports at least one service, and wherein each packet comprises a source service address for a source service sending the packet and a destination service address for a recipient service receiving the packet.

9. The apparatus of claim 8, wherein each service supports at least one service port, and wherein each packet further comprises a source service port for a service port at the source service and a destination service port for a service port at the recipient service.

10. The apparatus of claim 1, wherein the plurality of processing modules are operative to perform processing for a base station in a wireless communication system.

11. The apparatus of claim 1, wherein the plurality of processing modules are operative to perform processing for a terminal in a wireless communication system.

12. An application specific integrated circuit (ASIC), comprising:
a plurality of processing modules operative to send packets to one another via a common packet interface and to perform at least one function that involves transforming input data into output data, wherein the plurality of processing modules comprise a modem processing module and an encoding/decoding processing module; and
at least one transport module coupled to the plurality of processing modules and operative to forward the packets sent by the plurality of processing modules, wherein at least some of the plurality of processing modules perform different functions;

wherein each processing module comprises a network interface operative to receive and send packets for the processing module, a receive data buffer operative to store the input data from packets received by the network interface, a transmit data buffer operative to store the output data for packets to be sent by the network interface, and at least one processing unit operative to process the input data and provide the output data;

wherein each processing module further comprises a packet parser operative to receive the packets from the network interface, to provide the input data from the received packets to the receive data buffer, and to provide input control information from the received packets directly to the at least one processing unit, wherein the input control information is not stored in the receive data buffer; and wherein each processing module further comprises a packet builder operative to receive the output data from the transmit data buffer, to receive output control information directly from the at least one processing unit, and to build packets with the output data and in accordance with the output control information, wherein the output control information is not stored in the transmit data buffer.

13. The ASIC of claim 12, wherein each processing module supports at least one service, and wherein each packet comprises a source service address for a source service sending the packet and a destination service address for a recipient service receiving the packet.

14. A method for wireless communication, comprising:
receiving and sending packets among a plurality of processing modules of an apparatus via a common packet interface, wherein at least some of the plurality of processing modules perform different functions, and wherein the plurality of processing modules comprise a modem processing module and an encoding/decoding processing module; and
forwarding the packets sent by the plurality of processing modules via at least one transport module;
wherein receiving and sending the packets among the plurality of processing modules comprises:
receiving an input packet at a network interface of a processing module;
parsing the input packet to obtain input data and input control information, wherein the parsing is performed by a packet parser of the processing module;
providing the input data from the packet parser to a receive data buffer of the processing module;
providing the input control information directly from the packet parser to at least one processing unit of the processing module, wherein the input control information is not stored in the receive data buffer;
processing the input data from the receive data buffer in order to obtain output data and output control information, wherein the input data is processed as indicated by the input control information, and wherein the input data is processed by the at least one processing unit;
providing the output data from the at least one processing unit to a transmit data buffer of the processing module;
providing the output control information directly from the at least one processing unit to a packet builder of the processing module, wherein the output control information is not stored in the transmit data buffer; and
building an output packet with the output data from the transmit data buffer, wherein the output packet is built as indicated by the output control information, and wherein the output packet is built by the packet builder.

15. The method of claim 14, further comprising:
forming the packets in accordance with a common packet format comprising a header and a payload, the header comprising a source address and a destination address, and wherein the packets sent by the plurality of processing modules are forwarded based on source addresses and destination addresses of the packets.

16. The method of claim 14, wherein each processing module supports at least one service, and wherein each packet comprises a source service address for a source service sending the packet and a destination service address for a recipient service receiving the packet.

17. The method of claim 14, further comprising:
operating the plurality of processing modules asynchronously; and
operating the least one transport module asynchronously with respect to the plurality of processing modules.

18. An apparatus for wireless communication, comprising:
means for receiving and sending packets among a plurality of processing modules via a common packet interface, wherein at least some of the plurality of processing modules perform different functions, and wherein the plurality of processing modules comprise a modem processing module and an encoding/decoding processing module;
means for forwarding the packets sent by the plurality of processing modules via at least one transport module;
wherein the means for receiving and sending the packets among the plurality of processing modules comprises:
means for receiving an input packet at a network interface of a processing module;
means for parsing the input packet to obtain input data and input control information, wherein the parsing is performed by a packet parser of the processing module;
means for providing the input data from the packet parser to a receive data buffer of the processing module;
means for providing the input control information directly from the packet parser to at least one processing unit of the processing module, wherein the input control information is not stored in the receive data buffer;
means for processing the input data from the receive data buffer in order to obtain output data and output control information, wherein the input data is processed as indicated by the input control information, and wherein the input data is processed by the at least one processing unit;
means for providing the output data from the at least one processing unit to a transmit data buffer of the processing module;
means for providing the output control information directly from the at least one processing unit to a packet builder of the processing module, wherein the output control information is not stored in the transmit data buffer; and
means for building an output packet with the output data from the transmit data buffer, wherein the output packet is built as indicated by the output control information, and wherein the output packet is built by the packet builder.

19. The apparatus of claim 18, further comprising:
means for forming the packets in accordance with a common packet format comprising a header and a payload, the header comprising a source address and a destination address, and wherein the packets sent by the plurality of processing modules are forwarded based on source addresses and destination addresses of the packets.

20. The apparatus of claim 18, wherein each processing module supports at least one service, and wherein each packet comprises a source service address for a source service sending the packet and a destination service address for a recipient service receiving the packet.

21. The apparatus of claim 18, further comprising:
means for operating the plurality of processing modules asynchronously; and
means for operating the least one transport module asynchronously with respect to the plurality of processing modules.

22. A computer program product, comprising:
a non-transitory computer-readable medium comprising:
code for causing at least one computer to receive and send packets among a plurality of processing modules of an apparatus via a common packet interface, wherein at least some of the plurality of processing modules perform different functions, and wherein the plurality of processing modules comprise a modem processing module and an encoding/decoding processing module,
code for causing the at least one computer to forward the packets sent by the plurality of processing modules via at least one transport module;
wherein the code for receiving and sending the packets among the plurality of processing modules comprises:
code for receiving an input packet at a network interface of a processing module;
code for parsing the input packet to obtain input data and input control information, wherein the parsing is performed by a packet parser of the processing module;
code for providing the input data from the packet parser to a receive data buffer of the processing module;
code for providing the input control information directly from the packet parser to at least one processing unit of the processing module, wherein the input control information is not stored in the receive data buffer;
code for processing the input data from the receive data buffer in order to obtain output data and output control information, wherein the input data is processed as indicated by the input control information, and wherein the input data is processed by the at least one processing unit;
code for providing the output data from the at least one processing unit to a transmit data buffer of the processing module;
code for providing the output control information directly from the at least one processing unit to a packet builder of the processing module, wherein the output control information is not stored in the transmit data buffer; and
code for building an output packet with the output data from the transmit data buffer, wherein the output packet is built as indicated by the output control information, and wherein the output packet is built by the packet builder.

* * * * *